J. WARD.
WATERING TANK.
APPLICATION FILED MAY 8, 1916.

1,230,056.

Patented June 12, 1917.

Inventor:
John Ward.
by: [signature]
Attorney

UNITED STATES PATENT OFFICE.

JOHN WARD, OF BAKER, OREGON.

WATERING-TANK.

1,230,056.

Specification of Letters Patent.   Patented June 12, 1917.

Application filed May 8, 1916.  Serial No. 96,044.

*To all whom it may concern:*

Be it known that I, JOHN WARD, a citizen of the United States, residing at Baker, in the county of Baker and State of Oregon, have invented a new and useful Improvement in Watering-Tanks, of which the following is a specification.

This invention relates to improvements in watering tanks, and more particularly to that class which is adapted for supplying poultry and other small stock with drinking water. The invention provides a device of the kind stated, which is simple and inexpensive in construction and in which the drinking water can be easily replenished. The invention further provides means by which the drinking water can be kept from freezing in severe weather and an improved structure which will distribute the heat evenly over a wide surface area to more economically prevent the water from freezing.

To these ends my invention comprises the features of construction and combination of parts hereinafter more particularly described and claimed.

Figure 2:
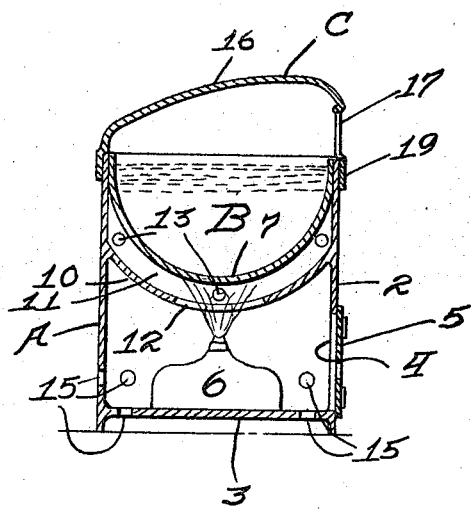
Figure 1:
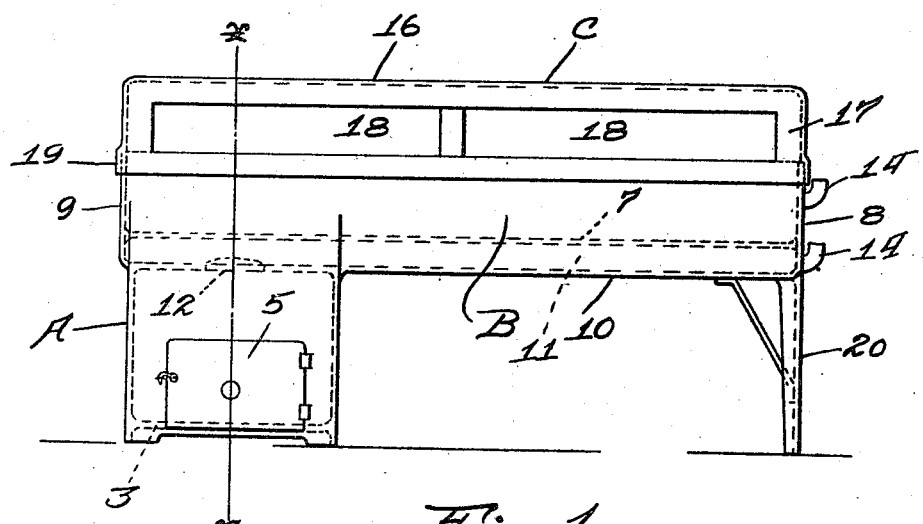

In the drawing forming part of this specification, Figure 1 is a front elevation, and Fig. 2 is a section taken upon the line X—X of Fig. 1.

In the drawing, A indicates a heater housing having side walls 2, a floor 3 spaced above the lower edges of said side walls and an opening 4 which is closed by a door 5, said opening being provided for placing a lamp 6 or other suitable heater within said housing and for convenience in regulating said heater. Situated across the upper portion of the housing A and extending laterally therefrom is a long watering trough B formed by a curved floor 7, which is closed at both of its ends by the end walls 8 and 9. Spaced below the trough floor is a correspondingly curved jacket wall 10 also extending across the heater housing and surrounding the floor both within and beyond the housing, so as to combine with the trough floor 7 in forming an enveloping passage 11. Situated above the lamp 6 is an opening 12 entering the space between the floor 7 of the trough and the jacket wall 10 below the trough and in the outer end wall 8 are vent openings 13 (see Fig. 2) arranged so that the products of combustion emitted by the lamp may egress from the enveloping heating space 11. Placed over each of the vent openings 13 and curved upwardly is an outlet tube 14. The vent openings 13 are distributed, so that the current of heated air and gases passing through the duct 11 extends evenly over the entire surface of the trough floor 7 throughout the entire length of the trough, said arrangement thereby minimizing the amount of heat necessary for preventing the water in the trough from freezing. Draft inlet openings 15 for air into the heater compartment are provided in the floor and walls of said compartment. The trough is provided with a cover C consisting of a top wall 16 curved upwardly toward the front portion of the trough and the front 17 of said cover is formed with a long narrow opening 18 through which access to the water is provided for the poultry and small stock. This cover is detachably mounted upon the trough by means of a slip or stove pipe joint 19, although it will be understood that any means of attachment may be provided. The outer end of the trough structure is provided with a leg 20 coöperating with the heater housing to support the trough in horizontal position.

The structure thus produced is fire proof and produces an efficient device for supplying a number of chickens or other small stock with clear drinking water both in warm and cold weather and also supplies means for heating the water in cold weather which requires a minimum amount of fuel.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claim.

Having described my invention, what I claim as new and desire to protect by Letters Patent is:

A watering tank for live stock comprising an elongated substantially semi-cylindrical trough, having a closure member provided with an opening through which access to the interior may be had, a leg for supporting said trough at one end, a housing for supporting said trough at its other end, a jacket spaced from and surrounding the outer surface of said trough throughout its several dimensions, said jacket having a communicating opening with said housing and being provided with vents at a point remote from said housing, and a heater positioned within said housing, the heat therefrom passing through the opening in said jacket, thence entirely throughout the length thereof about the surface of said trough and out through the vents to atmosphere.

In testimony whereof, I have signed my name to this specification.

JOHN WARD.

Copies of this patent may be obtained for five cents each, by addressing the "Commissioner of Patents, Washington, D. C."